(12) United States Patent
Demeilliez et al.

(10) Patent No.: US 11,108,680 B2
(45) Date of Patent: Aug. 31, 2021

(54) DYNAMIC ROUTING METHOD IN A NETWORK OF CONNECTED OBJECTS

(71) Applicant: BULL SAS, Les Clayes-sous-Bois (FR)

(72) Inventors: Bruno Demeilliez, Saint Laurent du Pont (FR); Gilles Menigot, Froges (FR); Wajih Chaabane, Chambery (FR)

(73) Assignee: BULL SAS, Les Clayes-sous-Bois (FR)

( * ) Notice: Subject to any disclaimer, the term of this patent is extended or adjusted under 35 U.S.C. 154(b) by 78 days.

(21) Appl. No.: 16/730,177

(22) Filed: Dec. 30, 2019

(65) Prior Publication Data
US 2020/0213218 A1  Jul. 2, 2020

(30) Foreign Application Priority Data

Dec. 31, 2018 (EP) .................................... 18306904
May 6, 2019 (FR) .................................... 1904713

(51) Int. Cl.
| | |
|---|---|
| H04L 12/715 | (2013.01) |
| H04W 40/24 | (2009.01) |
| H04L 12/721 | (2013.01) |
| H04L 12/66 | (2006.01) |
| H04L 12/751 | (2013.01) |
| H04L 29/08 | (2006.01) |

(52) U.S. Cl.
CPC ............ *H04L 45/124* (2013.01); *H04L 12/66* (2013.01); *H04L 45/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,300,581 B1 * | 3/2016 | Hui | ..................... H04L 61/2015 |
| 9,705,747 B1 | 7/2017 | Xue et al. | |
| 2016/0036764 A1 | 2/2016 | Dong et al. | |
| 2017/0054594 A1 * | 2/2017 | Decenzo | ................. G08B 25/08 |
| 2019/0042884 A1 * | 2/2019 | Guim Bernat | ......... G06N 3/063 |
| 2019/0045034 A1 * | 2/2019 | Alam | ...................... H04L 67/30 |
| 2019/0075073 A1 * | 3/2019 | Erickson | ................. H04W 4/80 |
| 2020/0036717 A1 * | 1/2020 | Akella | ................ H04L 12/4625 |

FOREIGN PATENT DOCUMENTS

| | | |
|---|---|---|
| EP | 1263167 A1 | 12/2002 |
| WO | 2018132323 A1 | 7/2018 |

* cited by examiner

*Primary Examiner* — Ajit Patel

(74) *Attorney, Agent, or Firm* — ARC IP Law, PC; Joseph J. Mayo (57) ABSTRACT

A method for dynamic routing in a network of connected objects is proposed comprising at least two connection gateways to at least one data transport network. In particular, the method which makes possible for each connection gateway of a network of connected objects to recognize, in real-time, changes in its environment, and to select the message transmission path from one connected object to another that is associated with an optimal level of (transmission) performance.

13 Claims, 2 Drawing Sheets

DYNAMIC ROUTING METHOD IN A NETWORK OF CONNECTED OBJECTS

CROSS-REFERENCE TO RELATED APPLICATIONS

This application claims the benefit of European Patent Application No. 18306904.6 filed Dec. 31, 2018 and French Patent Application No. 1904713 filed May 6, 2019, the disclosures of which are herein incorporated by reference in its entirety.

This invention relates to the field of connected objects and, specifically, the exchange of data in a network infrastructure comprising connected objects. It relates in particular to a method for dynamic routing in a network of connected objects which comprises connection gateways that respectively use different communication interfaces.

BACKGROUND ART

The Internet of Things (IoT) refers to all objects connected to the Internet and it is a field of Information and Communications Technologies (ICT) that is rapidly growing. In fact, the IoT has applications in more and more varied fields, such as, for example: the smart city, self-driving cars, automated houses or even smart home management.

The electronic devices concerned with these applications are called connected objects, in the sense that they interact through local sub-networks that can be connected to a central, high-speed network (a data transport network) such as, for example, the Internet. These sub-networks can not only be connected to the Internet, but they can also be interconnected within the same network of connected objects. In any case, the connection gateways specific to each sub-network ensure the routing of the messages which go through, on one hand, among the different connected objects of a network of connected objects and, on the other hand, among connected objects of this network of connected objects and a data transport network.

The ability of a connection gateway to ensure the routing of messages among connected objects respectively belonging to different sub-networks requires this gateway to solve several technical challenges. First, to the degree that the network infrastructure formed by the different sub-networks is constantly changing, each connection gateway must be able to adapt to these changes. In particular, a connection gateway must be able to regularly update the information whereupon it bases itself to embody its routing operations, and, in particular, the information which allows for the connection gateway to know the possible different transmission paths for transmitting a message from a source connected object to a receiving connected object. This ability of a connection gateway to regularly discover or rediscover its environment within the network infrastructure is essential so that each connected object of the network can transmit messages to any other connected object of the same network regardless of the changes in the overall network infrastructure.

Additionally, for a transmission to be carried out optimally, each connection gateway must also be able to intelligently select the most appropriate transmission path to transmit a message when several transmission paths are available. By the most appropriate is meant, for example, the path guaranteeing the choice of the most stable possible transmission, or of the fastest possible transmission.

Finally, in addition to the fact that each subnetwork potentially relies on its own technology for connectivity to a data transport network (for example via an ADSL Box, a 4G BOX, a WiMax connection, a Satellite connection or a mobile phone), each connection gateway also potentially uses one or more different communication interfaces. Typically, a connection gateway for a network of connected objects can use Ethernet interfaces, WIFI interfaces, Bluetooth interfaces, RF433 interfaces, or even IrDA interfaces. Thus, the interconnection among the different connection gateways associated with different sub-networks, assumes that each connection gateway is capable of ensuring its routing functions regardless of the different communication interfaces used by the different connection gateways involved.

Patent application WO2018132323 describes a smart multi-modal connection gateway. This gateway allows to resolve connection and resource sharing problems in order to minimize or eliminate data transmission and latency interruptions. For this purpose, the connection gateway includes an intelligent fog computing platform, which also includes fog computing logic that facilitates the creation of networks including the operation of automatic discovery, computing, storage and networking services between terminals and data centers, as well as connectivity interfaces to a variety of networks, devices and resources. Additionally, the platform comprises an artificial intelligence (AI) for decision-making. The decision-making rules can be configured dynamically and the smart gateway can connect itself to another gateway. Thus, a mesh can be established among connected objects in a network infrastructure of connected objects comprising several connection gateways to data transport networks using different communication networks. However, this document does not describe a method that allows for a connection gateway to regularly discover its environment, or to intelligently select a transmission path between a connected object connected to it and another remote connected object.

Technical Problem

The purpose of the invention is to remedy the above-mentioned problems from the background art. In particular, the purpose of the invention is to propose a method that allows each connection gateway of a network of connected objects to recognize, in real time, its environment, i.e. the network infrastructure that it forms with other connection gateways of a network of connected objects and to select the message transmission path from one connected object to another that is associated with an optimal level of (transmission) performance. Additionally, the method also applies when the routing must occur between connection gateways using different communication interfaces.

BRIEF DISCLOSURE OF THE INVENTION

For this purpose, a first aspect of the invention proposes a dynamic routing method in a network of connected objects comprising at least two connection gateways to at least one data transport network, said connection gateways each having their respective communication interfaces, preferably said communication interfaces using different communication protocols, said method comprising the following steps, executed by a first connection gateway in the network of connected objects:

step-by-step discovery of the environment of said first connection gateway comprising:

the transmission of a request to each communication interface of said first connection gateway;

in response to the request broadcast, the reception of response messages coming from the connected objects in the network of connected objects, each response message comprising identification information respectively associated with one or more specific connected objects of said network;

in response to the request broadcast, furthermore, the reception of mesh messages from at least a second connection gateway in the network of connected objects, each mesh message comprising identification and accessibility information associated with, respectively, said second connection gateway;

and, at the time of reception by the first connection gateway of a message to be transmitted from a source connected object to a receiving connected object both belonging to the network of connected objects:

the dynamic selection of a transmission path for the message to be transmitted, based on the identification information associated with the connected objects in the network of connected objects and based on the identification and accessibility information associated with the second connection gateways in the network of connected objects.

This method is particularly useful in an environment comprising several connection gateways between connected objects with different communication protocols and for which the availability or connectivity characteristics may change over time. Thus, using such a method, it is possible to have objects communicate while using different communication protocols, some of which are not directly available for the connected object. For example, a sensor (temperature, barometer) which only communicates under the RTL433 protocol with a computer, will be able to communicate with a telephone which is linked to a wifi network, going through a gateway such as a wifi box which links the computer and the telephone. In particular, this invention proposes a mechanism that allows for the connected objects to use different communications technologies (wifi, wired network, Bluetooth, IR) from other connected objects to which they are directly connected (latency=0) in order to dialog with the connected objects which are connected to these first connected objects and so on. Therefore, this allows to link the connected objects therebetween by incorporating different communications technologies.

Additionally, in order to ensure the transmission of a message between a connected object and a remote device (such as another connected object) within a network with different communications technologies, it is desirable to have available a dynamic routing mechanism which can provide, to the connected object wishing to send a message, the most effective path to the receiving device, and to do so through diverse communication protocols.

Thus, one of the advantages of the invention is to allow objects using different protocols to communicate, when they would not normally be able to dialog with each other. The mechanism allows to uniquely identify the different connected objects in the sub-network(s) and to be able to route messages despite the fact that the connected objects use different communication protocols.

In one embodiment, the step of dynamic selection of a transmission path of the message to be transmitted comprises the calculation of a performance level respectively associated with each accessible transmission path and the selection, from among the accessible transmission paths, of the transmission path presenting the highest performance level.

In one embodiment, the method further comprises the sending by the first connection gateway of the message to be transmitted, to the receiving connected object, by the selected transmission path.

In one embodiment, the identification information associated with a specific connected object comprises one or more of the following types of information:

the type of communication interface supported by the first connection gateway for the connection with said connected object;

the name of the communication interface supported by the first connection gateway for the connection with said connected object;

the address of said connected object on the communication interface supported by the first connection gateway for the connection with said connected object;

the unique, universal identifier, UUID, of said connected object; and, a list of the unique universal identifiers of the other connected objects in the network of connected objects with which said connected object has an established communication link.

In one embodiment, the identification and accessibility information associated with a second communication gateway comprises one or more of the following types of information:

the type of communication interface supported by the first connection gateway for the connection with said second connection gateway;

the name of the communication interface supported by the first connection gateway for the connection with said second connection gateway;

the address of said second connection gateway on the communication interface supported by the first connection gateway for the connection with said second connection gateway; and a list of unique universal identifiers, UUIDs, comprising:
UUIDs of remote connected objects directly connected to said second connection gateway;
UUIDs of the other remote connected objects with which the connected objects directly connected with said second connection gateway have an established communication link; and/or
unique universal identifiers, UUIDs, of the other connection gateways in the network of connected objects which can transmit messages via said second connection gateway.

In one embodiment, the list of unique universal identifiers is obtained by the concatenation of all the unique universal identifiers included in said list.

In one embodiment, the communication interfaces used by the connection gateways include Ethernet interfaces, WIFI interfaces, Bluetooth interfaces, RF433 interfaces, or IrDA interfaces.

In one embodiment, the identification information associated with the connected objects and the information and accessibility information associated with the second connection gateways are stored in a memory of the first connection gateway, preferably in the form of lists, and are updated upon reception of a response message and/or of a mesh message by said first connection gateway.

In one embodiment, the identification information associated with connected objects and the identification and accessibility information associated with the second connection gateways further comprise a value that represents the latency associated with the transmission of data from the first connection gateway to said connected object or to said second connection gateway, respectively.

In one embodiment, the identification information associated with connected objects and the identification and accessibility information associated with the second connection gateways further comprises a value that represents the distance separating the first connection gateway of said connected object or of said second connection gateway, respectively.

In one embodiment, the value that represents the distance separating the first connection gateway from a connected object or a second connection gateway, is determined, in the case of a connected object, by the number of connection gateways separating the first gateway and the connection gateway directly connected to said connected object, and, in the case of a second connection gateway, by the number of connection gateways separating the first gateway and said second connection gateway, respectively.

According to a second aspect, the invention relates to a connection gateway of a network of connected objects, said network of connected objects comprising at least two connection gateways to at least one data transport network, said connection gateways, each having their respective communication interfaces, wherein said connection gateway is characterized in that it comprises:

a discovery module configured to allow for the connection gateway to discover step-by-step its environment within the network of connected objects and comprising:
  means for the transmission of a request to each communication interface of said first connection gateway; and
  means for the reception of messages coming from connected objects and/or connection gateways in the network of connected objects, said messages comprising identification information associated with one or more specific connected objects or identification and accessibility information associated with one or more specific connection gateways;
a selection module configured to select a transmission path whereupon the connection gateway receives a message to transmit from a source connected object to a receiving connected object in the network of connected objects, wherein said selection is executed based on the information recovered by the discovery module.

According to a third aspect, this invention relates to a data communication system comprising at least one data transport network and one network of connected objects with a plurality of connection gateways, each having their respective communication interfaces, wherein said communication interfaces use different communication protocols and each connection gateway is configured to discover, step-by-step, its environment within the network of connected objects to which it belongs and in order to select a transmission path wherein it receives a message to be transmitted from a source connected object to a receiving connected object on the basis of information associated with the connected objects and with the connection gateways of its environment and comprises, for this purpose:

means for a request broadcast on each of its communication interfaces; and
means for the reception of messages coming from connected objects and/or connection gateways in the network of connected objects, said messages comprising identification information associated with one or more specific connected objects or identification and accessibility information associated with one or more specific connection gateways.

Other benefits and characteristics of the invention will become evident in the following description, given as an illustrative and non-limiting example, referring to the figures in the attached drawings, wherein.

DISCLOSURE OF THE INVENTION

Figure 1:
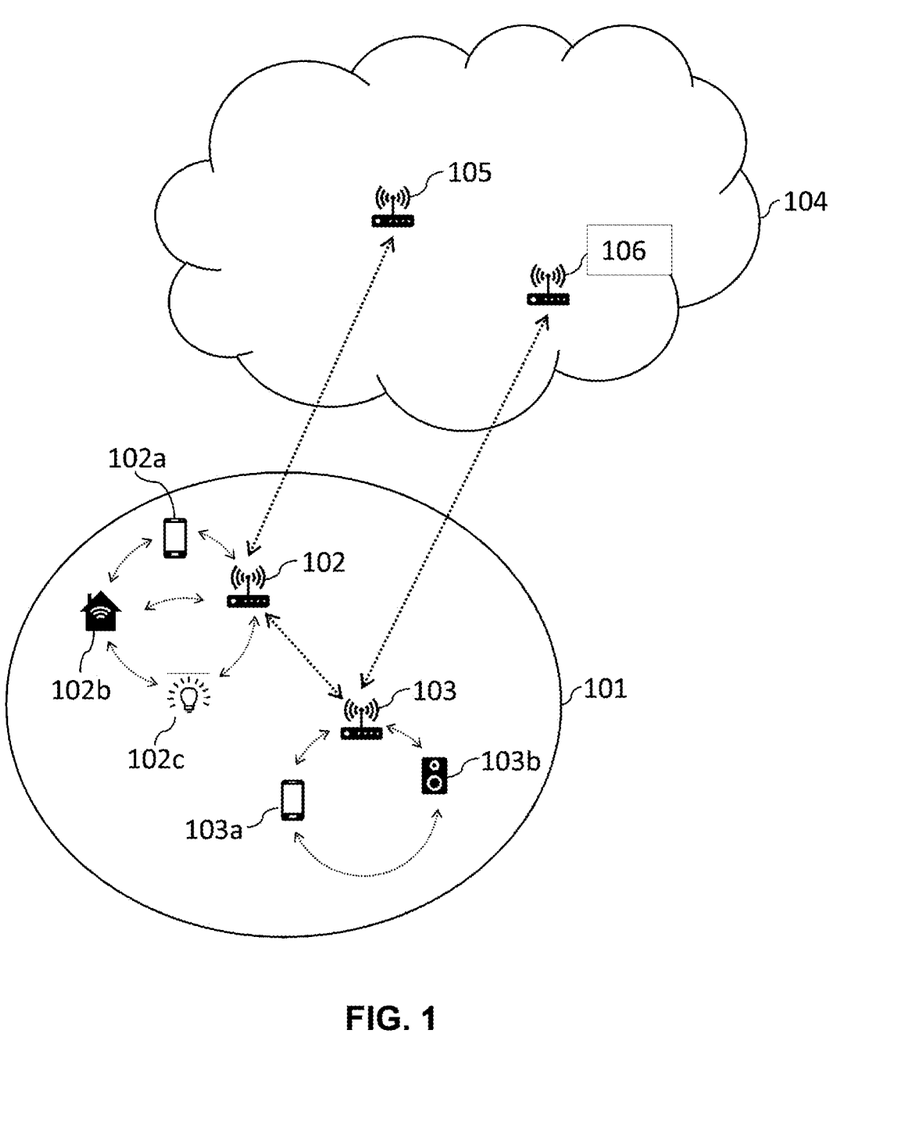
FIG. 1 is a schematic representation of an embodiment of a network of connected objects in which the method can be implemented.

Referring to the diagram in FIG. 1, an embodiment of a network of connected objects wherein the method can be implemented will be first described.

In the next part of the disclosure, a connected object is an electronic object connected, by a wired or wireless connection, to a data transport network, such that the connected object can share data with another connected object, a server, a fixed or movable computer, an electronic tablet, a smart phone or any other connected device of a given network. In a known manner, such connected objects can be, for example, home automation devices, smart lighting devices, connected speakers or even smart phones.

Gateway or connection gateway, within the meaning of the invention, means equipment ensuring the connection between equipment belonging to different local networks or sub-networks, for example, ensuring the connection between equipment of a network of connected objects (local IP addresses) and Internet services (public IP addresses). Thereby, such a gateway has two types of IP addresses. Its public IP address, allocated by the FAI, makes it possible for it to exchange data with the Internet network. Its local IP address makes it possible for it to exchange data with the equipment in its local sub-network. Generally, it is specific and allocated by default by the ISP.

Within the meaning of the invention, sub-network or local network means, for example, local networks, each served by at least one connection gateway to another network such as the Internet and to which the connected objects are connected.

The expression communication protocols, within the meaning of this invention, means, for example data exchange rules between different entities. Communication protocols correspond, for example, to wifi, wired networks, Bluetooth, Infra-red, Zigbee, LTE, 5G and 3G.

Within the meaning of this invention, message or message to be transmitted, means a message sent between connected objects through at least one gateway or between connected object and gateway, or even between gateways, and comprising data that may include information related to their status and to that of their environment. The format of this data can, for example, correspond to files, media streams (video, audio) or coded values.

Within the meaning of the invention, request or request message mean a message sent between two connected objects through at least one gateway and comprising data from a connected object. A request message may, additionally, comprise an identifier for the selected receiving gateway, messages parameters, and possible a time range for the transmission of a response message.

Within the meaning of this invention, a response message means a message sent by a connected object, preferably a recipient object, to another connected object, preferably a source object, in response to a request or a request message issued by the source connected object. A response message can be stored or recorded on a storage medium.

Within the meaning of the invention, mesh message means a message sent by gateways to a gateway linked with the source connected object in response to a request message issued by the source connected object. A mesh message comprises preferably identification and accessibility information.

Within the meaning of the invention, transmission path means the set of the connection gateways through which a message issued by a source connected object must go through, in succession, in order to reach the receiving connected object.

Within the meaning of the invention, list means a plurality of data that allow to indicate specific information, in particular in connection with identification and/or accessibility information.

To process, calculate, determine, display, extract, compare or more broadly, an executable operation, within the meaning of this invention, means an action executed by a device or processor unless otherwise indicated. In this respect, operations relate to actions and/or processes in a data processing system, for example a computer system or electronic computing device, which manipulates and transforms data represented as physical (electronic) quantities in the memories of the computer system or other devices for storing, transmitting or displaying information. These operations can be based on applications or software programs.

The terms or expressions application, software program, program code and executable code mean any expression, code or notation in a set of instructions designed to produce data processing to perform a particular function directly or indirectly (e.g., after a conversion operation to another code). Examples of program code can include, not limited to, a sub-program, a function, an executable application, a source code, an object code, a library and/or any other sequence of instructions designed for execution on a computer system.

Within the meaning of this invention, processor means at least one physical circuit configured to execute operations according to the instructions contained in a code. The physical circuit can be an integrated circuit. Examples of a processor include, but are not limited to, a central processing unit, a graphic processor, an application-specific integrated circuit (ASIC) and a programmable logic circuit. A single processor, or several other units, can be used to embody the invention.

In the example shown in FIG. 1, the network of connected objects 101 allows to connect the different connected objects that it comprises to the data transport network 104, for example, to the Internet, via its connection gateways 102 and 103. In particular, the connection gateways 102 and 103 are adapted in order to establish a connection with a connection gateway in the data transport network 104. This connection may, for example, use a wired technology, such as the Ethernet technology, or a wireless technology, such as the 4G technology or the WiMax technology. In the example shown, the connection gateway 102 establishes a communication link with the connection gateway 105 while the connection gateway 103 establishes a communication link with the connection gateway 106.

Each of the two connection gateways 102 and 103 is directly connected to a plurality of connected objects in the network of connected objects 101. In particular, the connection gateway 102 is directly connected with connected objects 102a, 102b and 102c and the connection gateway 103 is directly connected with connected objects 103a and 103b. By the expression directly connected is meant the connection to the connection gateway of any connected object without this connection passing through an intermediate entity, whatever that may be. Additionally, the skilled person will understand that the different connected objects which are directly connected to a connection gateway are, in fact, also connected therebetween via said connection gateway. Finally, each connected object is capable of establishing other connections, i.e. other communication links, with other connected objects, which are not directly connected to the same connection gateway. In other words, a connected object can then be connected to a connection gateway without being directly connected to said gateway. In fact, in this case, it is connected via its communication link with a connected object, which in turn is directly connected to said connection gateway.

Typically, in networks of connected objects, each connection gateway uses one or more communications interfaces belonging to it in order to communicate with the connected objects that are directly connected to it. It may, for example, be an Ethernet interface, a WIFI interface, a Bluetooth interface, an RF433 interface or even an IrDA interface. These examples are non-limiting. The skilled person will understand that the embodiments are not limited by the number or the type or the nature of the connection interfaces which are supported. In any case, an advantage of the method according to the embodiment lies in particular in the fact that said method is applied in a network of connected objects comprising several connection gateways, while said connection gateways use different communication interfaces.

In summary, the connection gateways 102 and 103 in the network of connected objects 101 ensure the routing of data and, in particular, of messages between the connected objects that are connected to them and the data transport network 104. Additionally, these connection gateways are also adapted to ensure the routing of messages, by their intermediary, from a connected source object that is connected to them, directly or not, to a receiving connected object which is connected to another connection gateway of the network of connected objects. Thus, in the example shown in FIG. 1, the connection gateway 102 ensures the routing of messages exchanged with the data transport network 104 and, if applicable, with a connected object that is connected to the connection gateway 103. Conversely, the connection gateway 103 ensures the routing of messages exchanged with the data transport network 104, and, if applicable, with a connected object that is connected to the connection gateway 102.

The skilled person will understand that the example previously described referring to FIG. 1 is not exhaustive. In particular, embodiments of the method may be applied to a network of connected objects comprising at least two connection gateways, which allow to establish communication links with at least one data transport network. Each connection gateway can be connected, either directly or indirectly, with one or more connected objects, without limiting the number of intermediate gateways through which the messages are routed to the receiving connected object.

Figure 2:
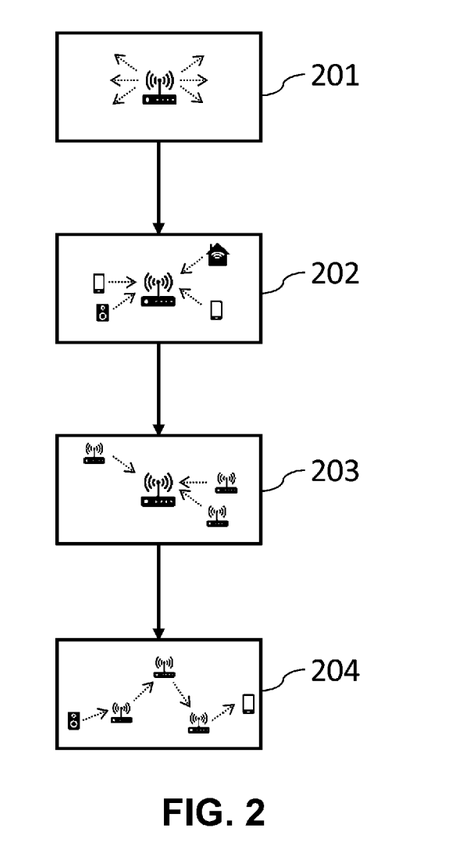
FIG. 2 is a diagram of the steps for the implementation of the method.

Referring to FIG. 2, a step-by-step diagram of a process implementation will now be described. The skilled person will understand that the method can be executed continuously, and it can thus allow for the dynamic management of the routing parameters of a connection gateway. Such a dynamic method allows, for example, to adapt in real-time to the addition or removal of a new connection gateway in the network of connected objects. Additionally, such a dynamic method allows, for example, to select an optimal transmission path between one connected object and another connected object.

The first step of the method allows, for a connection gateway in the network of connected objects to discover, step-by-step, its environment. The term environment herein refers to the different entities which are comprised in the network, connected objects or gateways, at a greater or lesser distance from the connection gateway in question. Additionally, the skilled person will understand that, in practice, each connection gateway in the network of connected objects can run the process in parallel and thus can discover or keep updated information on its environment on a regular basis.

This first step comprises a first sub-step 201 during which the connection gateway in question issues a broadcast request to all of its communication interfaces. Therefore, the request is broadcasted to all of the entities to which the connection gateway is connected, and this, regardless of the interface by which this connection is executed. In practice, such a broadcast request presents, for this purpose, specific parameters (linked to a certain port, channel, content) for each of the interfaces in question.

In response to this broadcast request, during the second sub-step 202, the connection gateway receives response messages, coming from the connected objects which received the broadcast request. Each response message thus returned to the gateway includes identification information specifically associated with the connected object from which it comes. In particular, the identification information associated with a specific connected object having sent a response can be, for example:

the type of communication interface supported by the first connection gateway for the connection with the connected object in question;

the name of the communication interface supported by the first connection gateway for the connection with the connected object in question;

the address of the connected object in question on the communication interface supported by the first connection gateway;

the unique universal identifier, UUID of the connected object in question; and/or, a list of the unique universal identifiers of the other connected objects in the network of connected objects with which the connected object in question has an established communication link.

In a way known to the skilled person, a UUID is a unique identifier attributed to a connected object which is generated by the manufacturer of said connected object. The list of unique universal identifiers comprises, therefore, UUIDs of connected objects to which the connected object that responded to the broadcast request can access.

In response also to the broadcast request, during the third sub-step 203, the connection gateway receives mesh messages coming from the connection gateways in the network of connected objects which received the broadcast request. Each mesh message thus returned to the connection gateway comprises identification and accessibility information specifically associated with the connection gateway from which it comes. In particular, the identification and accessibility information associated with a specific connection gateway having sent a response can be, for example:

the type of communication interface supported by the connection gateway which receives the message for connection with the connection gateway that sent the message;

the name of the communication interface supported by the connection gateway which receives the message for connection with the connection gateway that sent the message;

the address of the connection gateway that sent the message on the communication interface supported by the connection gateway that received the message;

a list of UUIDs which comprises, for example:

the UUIDs of so-called remote connected objects which are directly connected to the connection gateway in question;

UUIDs of the other remote connected objects with which the connected objects directly connected with said second connection gateway have an established communication link; and/or the UUIDs of other connection gateways in the network of connected objects which can transmit messages via the connection gateway in question.

In one particular embodiment of the method, this list of UUIDs can be obtained by a concatenation of all of the data that it contains, i.e., of all the unique universal identifiers that are included in said list. Advantageously, such a concatenation allows to limit the quantity of data transmitted. Additionally, with regard to connection gateways UUIDs, which can transmit messages via the connection gateway in question, these UUIDs allow to form the mesh, i.e., to link several connection gateways to each other. The gateways thus meshed can then transmit a message from a connected object directly connected to a connection gateway to a connected object directly connected to another connection gateway of the mesh.

In one particular embodiment of the method, the identification information associated with connected objects and the information and accessibility information associated with the second connection gateways are stored in a memory of each connection gateway. For example, this information can be stored in the form of one or more lists, which can, for example, be regularly updated, specifically upon the reception of a response message and/or of a mesh message by the connection gateway in question. For example, such an update takes place at each reception of a response message, which is the simplest solution. Advantageously, such lists group all the information to be used by the connection gateway in order to enable it to ensure its function, i.e., to execute message routing operations. The dynamic aspect of the method then results from this regular updating. Thus, at each iteration of the method, a list stored in a memory of the connection gateway can integrate, specifically, new identifiers associated with new connected objects or new connection gateways which responded to the broadcast request.

Additionally, in one particular embodiment of the method, a connected object or a connection gateway can be deleted from a list memorized by a specific connection gateway since their UUID did not receive any (response or mesh) message by said gateway during a duration greater than a specific threshold value, or when a specific number of successive iterations of the method has been executed without the matching UUID being returned to said specific connection gateway.

Step 204 is then executed, for example, at each reception by the connection gateway of a message to be transmitted from a source connected object to a receiving connected object both belonging to the network of connected objects: More particularly, this step comprises the dynamic selection of a transmission path for the message to be transmitted, based on the identification information associated with the connected objects in the network of connected objects and based on the identification and accessibility information associated with the second connection gateways in the network of connected objects.

In particular, this selection can, for example, rest on a calculation of a performance level respectively associated with each accessible transmission path by choosing the transmission path with the highest performance level. In particular embodiments, such a performance level can, for example, be determined using a latency value associated with a given transmission path and/or with a known distance between the source connected object and the receiving connected object. The weaker the latency, and/or the shorter the path, the better is the associated performance level.

In practice, in one embodiment of the method, the identification information associated with connected objects, and the identification and accessibility information associated with the connection gateways can comprise a value that represents the latency associated with a transmission of data from the connection gateway which receives the message to said connected object or to said second connection gateway, respectively. Thus, advantageously, upon reception of a message, a connection gateway can also recognize, and if applicable, memorize, a value that represents the latency associated with the data transmission to the entity in question. The information thus accumulated can then be used to execute the routing of the next messages.

In one embodiment of the method, the identification information associated with connected objects and the identification and accessibility information associated with the connection gateways can additionally comprise a value that represents the distance separating the connection gateway that receives the message from the connected object or from the second connection gateway, respectively. Such a value can, for example, correspond to the number of connection gateways that separate the connection gateway that receives the message from the connection gateway or the connected object that issued it. Additionally, if a connected object is recognized by a connection gateway (i.e., if its identifier is memorized in a list stored by said gateway), without it having responded to a broadcast request, the distance associated with it may be equal to the distance from the connection gateway with which it is directly connected, increased by one unit.

The skilled person will understand that the latency or distance values are non-limiting examples of criteria from which a specific performance level can be associated with a specific transmission path. Other criteria such as, for example, the stability of a connection or the quality of the transmission (expressed, for example, in the form of a rate of error on bits), could be used in order to determine such a performance level, instead of or as a supplement to these examples. In fact, these different criteria can be used cumulatively. Advantageously, it is thus possible to select the transmission path guaranteeing the quickest and/or the most reliable transmission of a message between a source connected object and a receiving connected object.

In a particular embodiment of the method, the different transmission paths accessible for transmitting a message to a receiving connected object can also be stored in a memory of the connection gateway. Additionally, it is thus possible, for a given connected object, to store in its memory only the transmission path associated with the highest performance level.

Finally, in another embodiment, the method also comprises a step of sending the message to be transmitted. Specifically, a connected message issues a request to a specific connection gateway to send a message to another connected gateway for which it recognizes an identifier. This connection gateway then uses the selected transmission path to transmit said message.

Figure 3:
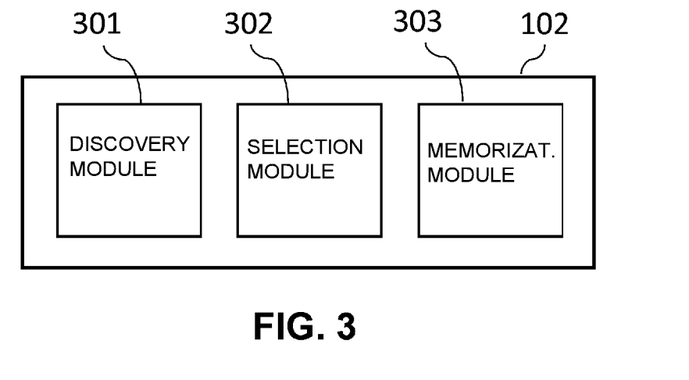
FIG. 3 is a functional diagram of an embodiment of a connection gateway according to the invention.

Referring to FIG. 3, a functional drawing of an embodiment of a connection gateway and a connected object according to the invention will now be described. The gateway is particularly suitable for carrying out the process described above. In the example shown, the connection gateway 102 therefore comprises a discovery module 301 and a selection module 302.

The discovery module 301 is advantageously configured to allow the connection gateway 102 to discover, step-by-step, its environment in the network of connected objects to which it belongs. In particular, the discovery module 301 can comprise means for a broadcast request on each communication interface in the connection gateway as well as reception means for messages coming from other entities in the network of connected objects. These means can be combinations of processors, random-access memory, read-only memory, cache memory, as well as codes (software programs) supporting instructions for operating these material components.

The selection module 302 is configured to select a transmission path whereupon the connection gateway 102 receives a message to be transmitted from a source connected object to a receiving connected object, both belonging to the network of connected objects. In particular, the selection module 302 is configured to select such a transmission path based on all of the information retrieved by the discovery module 301.

Additionally, the information recovered by the discovery module 301 can be memorized by a memorization module 303. To do this, the memorization module can comprise any readable support known in the art comprising, for example, a volatile memory, such as a static random access memory (SRAM) and a dynamic random access memory (DRAM), and/or a non-volatile memory, such as a read-only memory, flash memories, hard disks, optical disks and magnetic bands, or in the form of a volatile memory, such as a random access memory (RAM) and/or a cache memory.

This invention has been described and illustrated in this detailed description and in the figures of the annexed drawings in possible embodiments. This invention is, however, not limited to the forms of embodiment presented. Other variants and embodiments can be deduced and implemented by the person skilled in the art when reading this description and seeing the attached drawings.

As previously described, this invention proposes solutions making possible optimized routing, in the sense that each connection gateway can intelligently select the transmission path that is most appropriate to transmit a message when several transmission paths are available. For this purpose, the invention allows each connection gateway in a network of connected objects to recognize, in real-time, its environment, i.e. the network infrastructure that it forms with other connection gateways of a network of connected objects, and can also select the message transmission path from one connected object to another that is associated with an optimal level of (transmission) performance, and can do so even when the routing must occur between connection gateways using different communication interfaces.

The invention claimed is:

1. A method for dynamic routing in a network of connected objects comprising at least two connection gateways to at least one data transport network, said at least two connection gateways, each having their respective communication interfaces, said communication interfaces using different communication protocols, said method comprising steps, carried out by a first of said at least two connection gateways in the network of connected objects as follows:
- step-by-step discovery of an environment of a first connection gateway in the network of connected objects comprising:
  - a request broadcast to each communication interface of said first connection gateway;
  - in response to the request broadcast, reception of response messages coming from connected objects in the network of connected objects, each response message comprising identification information respectively associated with one or more specific connected objects in said network;
  - in response to the request broadcast, furthermore, reception of mesh messages from at least a second connection gateway in the network of connected objects, each mesh message comprising identification and accessibility information associated with, respectively, said second connection gateway;
  - and, at a time of reception by the first connection gateway of a message to be transmitted from a source connected object to a receiving connected object both belonging to the network of connected objects:
- dynamic selection of a transmission path to form a selected transmission path for the message to be transmitted, based on the identification information associated with the connected objects in the network of connected objects and based on the identification and accessibility information associated with the second connection gateway in the network of connected objects.

2. The method for dynamic routing according to claim 1, wherein the step of dynamic selection of a transmission path of the message to be transmitted comprises calculation of a performance level respectively associated with each accessible transmission path and selection, from among accessible transmission paths, of the transmission path with a highest performance level.

3. The method for dynamic routing according to claim 1 further comprising transmission by the first connection gateway of the message to be transmitted, to the receiving connected object, by the selected transmission path.

4. The method for dynamic routing according to claim 1, wherein the identification information associated with a specific connected object comprises one or more following types of information:
- a type of communication interface supported by the first connection gateway for connection with said connected object;
- a name of the communication interface supported by the first connection gateway for connection with said connected object;
- an address of said connected object on the communication interface supported by the first connection gateway for connection with said connected object;
- a unique, universal identifier, UUID, of said connected object; and,
- a list of unique universal identifiers of other connected objects in the network of connected objects with which said connected object has an established communication link.

5. The method for dynamic routing according to claim 1, wherein the identification and accessibility information associated with the second connection gateway comprises one or more following types of information:
- a type of communication interface supported by the first connection gateway for connection with said second connection gateway;
- a name of the communication interface supported by the first connection gateway for connection with said second connection gateway;
- an address of said second connection gateway on the communication interface supported by the first connection gateway for connection with said second connection gateway; and
- a list of unique universal identifiers, UUIDs, comprising:
  - UUIDs of remote connected objects directly connected to said second connection gateway;
  - UUIDs of other remote connected objects with which the connected objects directly connected with said second connection gateway have an established communication link; and/or
  - unique universal identifiers, UUIDs, of other connection gateways in the network of connected objects which can transmit messages through said second connection gateway.

6. The method for dynamic routing according to claim 5, wherein the list of unique universal identifiers is obtained by concatenation of all the unique universal identifiers included in said list.

7. The method for dynamic routing according to claim 1, wherein the communications interfaces used by the at least two connection gateways comprise Ethernet interfaces, WIFI interfaces, Bluetooth interfaces, RF433 interfaces, or IrDA interfaces.

8. The method for dynamic routing according to claim 1, wherein the identification information associated with the connected objects and information and accessibility information associated with second connection gateway are stored in a memory of the first connection gateway, and are updated upon reception of a said response message and/or of a said mesh message by said first connection gateway.

9. The method for dynamic routing according to claim 1, wherein the identification information associated with connected objects and the identification and accessibility information associated with second connection gateway further comprises a value that represents latency associated with a transmission of data from the first connection gateway to a connected object of said connected objects or to said second connection gateway, respectively.

10. The method for dynamic routing according to claim 1, wherein the identification information associated with connected objects and the identification and accessibility information associated with the second connection gateway additionally comprise a value that represents a distance separating the first connection gateway of said connected object or of said second connection gateway, respectively.

11. The method for dynamic routing according to claim 10, wherein the value that represents the distance separating the first connection gateway from a connected object or said second connection gateway is determined, in case of a connected object, by a number of connection gateways separating the first gateway and the connection gateway directly connected to said connected object, and in the case of said second connection gateway, by the number of connection gateways separating the first gateway and said second connection gateway, respectively.

12. A method for dynamic routing in a network of connected objects comprising at least two connection gateways to at least one data transport network, said at least two connection gateways, each having their respective communication interfaces, said communication interfaces using different communication protocols, said method comprising steps, carried out by a first of said at least two connection gateways in the network of connected objects as follows:
- step-by-step discovery of an environment of a first connection gateway in the network of connected objects comprising:
  - a request broadcast to each communication interface of said first connection gateway;
  - in response to the request broadcast, reception of response messages coming from connected objects in the network of connected objects, each response message comprising identification information respectively associated with one or more specific connected objects in said network;
  - in response to the request broadcast, furthermore, reception of mesh messages from at least a second connection gateway in the network of connected objects, each mesh message comprising identification and accessibility information associated with, respectively, said second connection gateway;
- and, at a time of reception by the first connection gateway of a message to be transmitted from a source connected object to a receiving connected object both belonging to the network of connected objects:
- dynamic selection of a transmission path to form a selected transmission path for the message to be transmitted, based on the identification information associated with the connected objects in the network of connected objects and based on the identification and accessibility information associated with the second connection gateway in the network of connected objects;
- wherein the step of dynamic selection of a transmission path of the message to be transmitted comprises calculation of a performance level respectively associated with each accessible transmission path and selection, from among accessible transmission paths, of the transmission path with a highest performance level;
- wherein the identification information associated with a specific connected object comprises one or more following types of information:
  - a type of communication interface supported by the first connection gateway for connection with said connected object;
  - a name of the communication interface supported by the first connection gateway for connection with said connected object;
  - an address of said connected object on the communication interface supported by the first connection gateway for connection with said connected object;
  - a unique, universal identifier, UUID, of said connected object; and,
  - a list of unique universal identifiers of other connected objects in the network of connected objects with which said connected object has an established communication link.

13. A method for dynamic routing in a network of connected objects comprising at least two connection gateways to at least one data transport network, said at least two connection gateways, each having their respective communication interfaces, said communication interfaces using different communication protocols, said method comprising steps, carried out by a first of said at least two connection gateways in the network of connected objects as follows:
- step-by-step discovery of an environment of a first connection gateway in the network of connected objects comprising:
  - a request broadcast to each communication interface of said first connection gateway;
  - in response to the request broadcast, reception of response messages coming from connected objects in the network of connected objects, each response message comprising identification information respectively associated with one or more specific connected objects in said network;
  - in response to the request broadcast, furthermore, reception of mesh messages from at least a second connection gateway in the network of connected objects, each mesh message comprising identification and accessibility information associated with, respectively, said second connection gateway;
- and, at a time of reception by the first connection gateway of a message to be transmitted from a source connected object to a receiving connected object both belonging to the network of connected objects:
- dynamic selection of a transmission path to form a selected transmission path for the message to be transmitted, based on the identification information associated with the connected objects in the network of connected objects and based on the identification and accessibility information associated with the second connection gateway in the network of connected objects;
- wherein the identification and accessibility information associated with the second connection gateway comprises one or more following types of information:
  - a type of communication interface supported by the first connection gateway for connection with said second connection gateway;
  - a name of the communication interface supported by the first connection gateway for connection with said second connection gateway;
  - an address of said second connection gateway on the communication interface supported by the first connection gateway for connection with said second connection gateway; and
  - a list of unique universal identifiers, UUIDs, comprising:
    - UUIDs of remote connected objects directly connected to said second connection gateway;
    - UUIDs of other remote connected objects with which the connected objects directly connected with said second connection gateway have an established communication link; and/or
    - unique universal identifiers, UUIDs, of other connection gateways in the network of connected objects which can transmit messages through said second connection gateway;
- wherein the identification information associated with connected objects and the identification and accessibility information associated with second connection gateway further comprises a value that represents latency associated with a transmission of data from the first connection gateway to a connected object of said connected objects or to said second connection gateway, respectively.

* * * * *